June 9, 1953 V. DUCASSE 2,641,631
FIXTURE FOR TESTING CARD POTENTIOMETERS
Filed Jan. 3, 1951 4 Sheets-Sheet 1
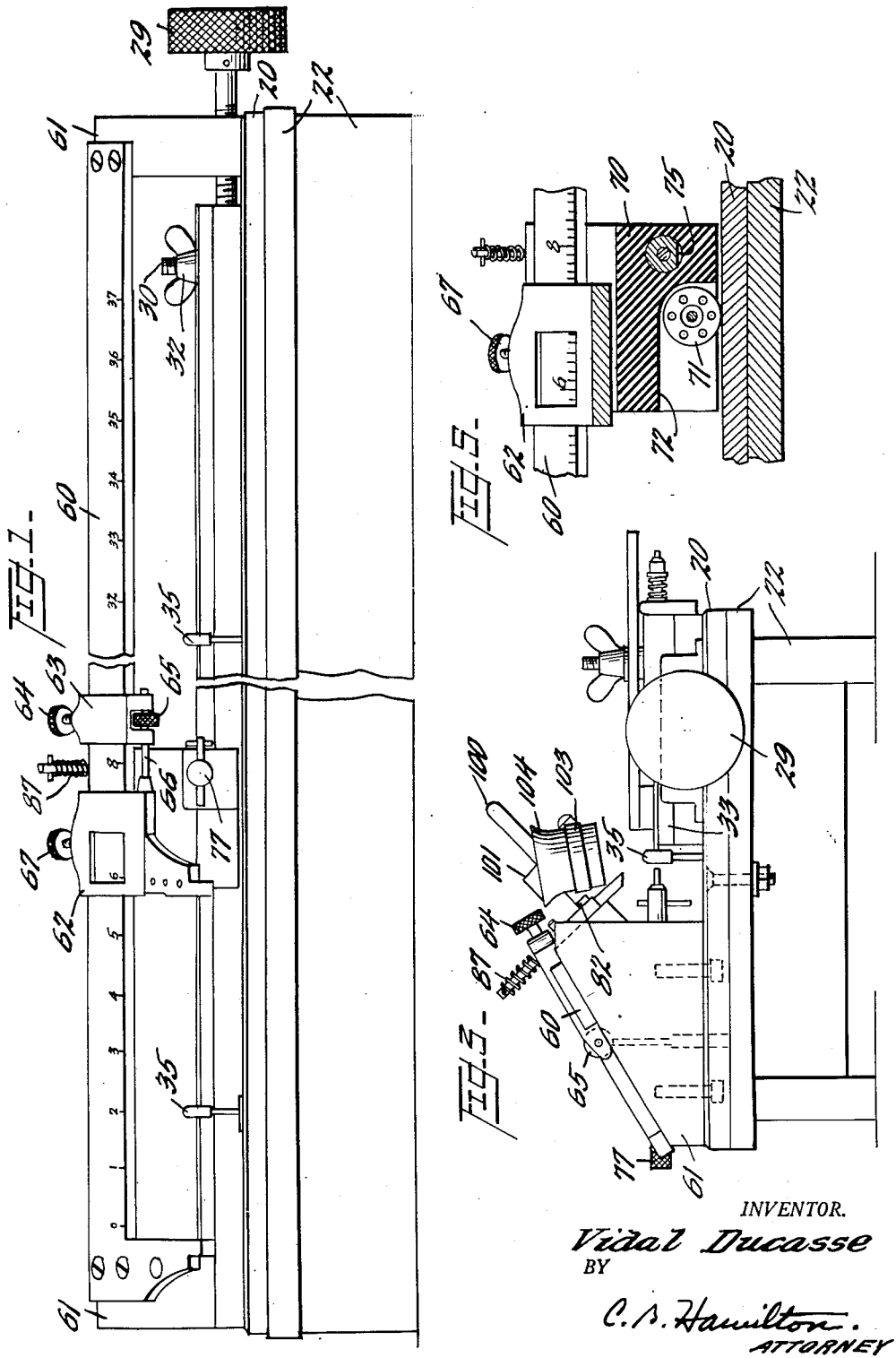
INVENTOR.
Vidal Ducasse
BY
C. S. Hamilton.
ATTORNEY

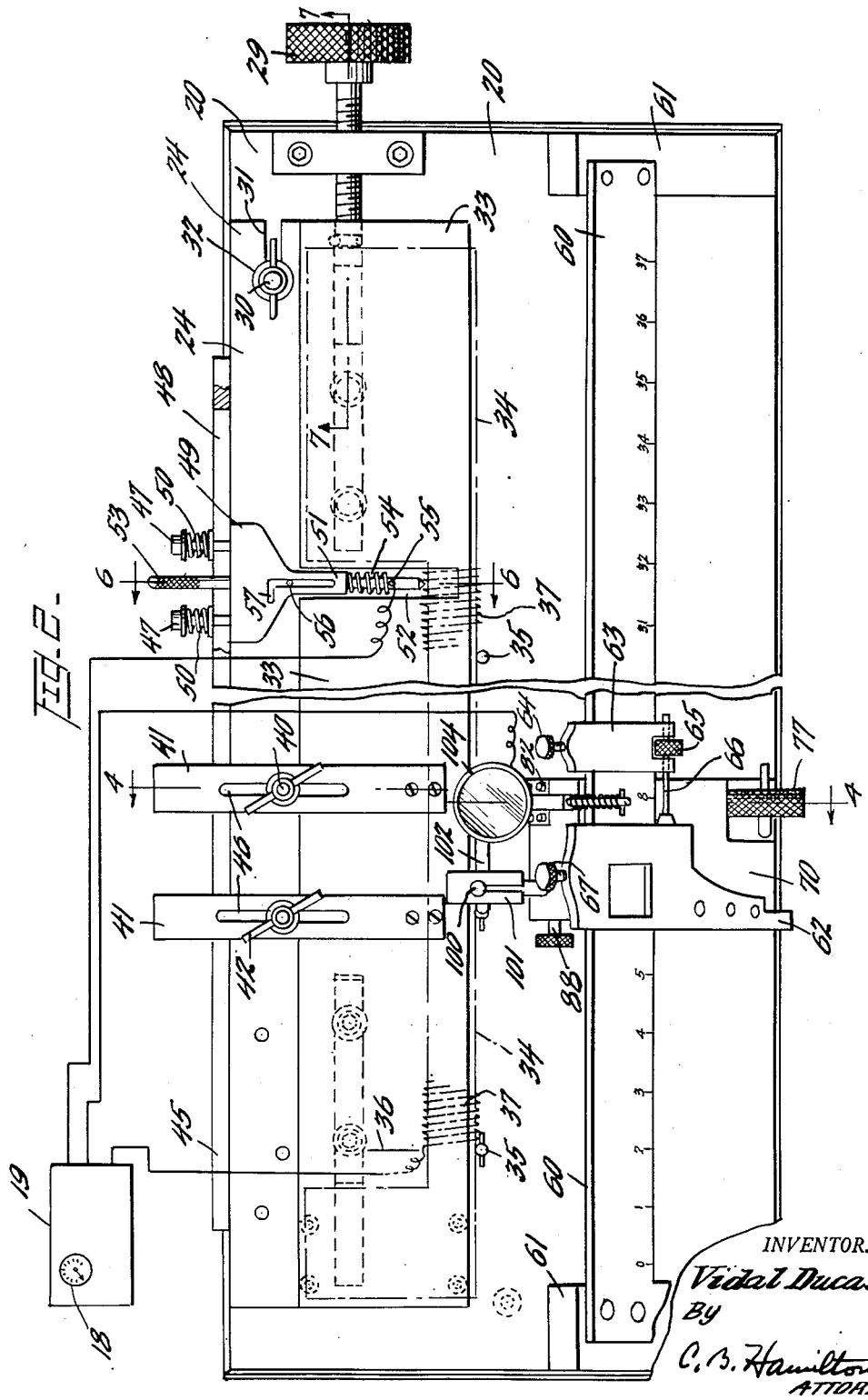

June 9, 1953  V. DUCASSE  2,641,631
FIXTURE FOR TESTING CARD POTENTIOMETERS
Filed Jan. 3, 1951  4 Sheets-Sheet 3

INVENTOR.
Vidal Ducasse,
BY
C. B. Hamilton
ATTORNEY

INVENTOR.
Vidal Ducasse,
BY
C. B. Hamilton
ATTORNEY

Patented June 9, 1953

2,641,631

UNITED STATES PATENT OFFICE 2,641,631

FIXTURE FOR TESTING CARD POTENTIOMETERS

Vidal Ducasse, Winston-Salem, N. C., assignor to Western Electric Company, Incorporated, New York, N. Y., a corporation of New York Application January 3, 1951, Serial No. 204,212

12 Claims. (Cl. 175—183)

This invention relates to a card potentiometer testing fixture and more particularly to a fixture for determining and marking the positions of desired resistance ratios on a wire wound card potentiometer.

In order to utilize the variable resistance ratio characteristic of a wire wound potentiometer to control sensitive electrical circuits, it is necessary that the desired ratios of the entire resistance of the potentiometer winding to the resistance of the selected portions of the winding be accurately determined. Attempts have been made in the past to select the desired ratios of potentiometer resistance by physically measuring and marking the linear separation between successive points on the potentiometer winding. The ratios obtained by merely measuring the linear separation between successive points on the winding of the potentiometer are not accurate because of variations in wire resistance and variations in the number of convolutions of resistance wire in a unit distance along the length of the potentiometer winding.

Accordingly, an object of this invention is to provide a testing fixture for accurately determining and indicating points on the winding of a card potentiometer, at which points the resistance of the tapped portion of the winding bears a desired relation to the resistance of the entire winding.

Another object of this invention is to provide a fixture for accurately calibrating a linear wirewound card potentiometer in units of resistance wherein each unit of resistance forms a desired ratio of resistance when compared with the resistance of the entire potentiometer winding.

In accordance with these and other objects, an embodiment of the invention comprises a card potentiometer holding means mounted on a base and having means cooperating with the holding means to align the card in a predetermined position on the base. A calibrated bar secured to the base adjacent the card slidably supports a block having an electrical contacting means therein. The block is moved along the bar to various desired positions and the electrical contacting means is moved into engagement with the wire of the potentiometer winding at these points to make electrical connection between the potentiometer winding and an external test set for determining the ratio between the resistance of the winding and the resistance of the portion of the winding electrically intercepted by the electrical contacting means. A marking pen mounted on the block in alignment with the electrical contacting means is moved into engagement with the card to mark those positions of the contacting means where the resistance ratio is satisfactory.

A more complete understanding of this invention will be had by considering the following specification in conjunction with the drawings wherein Fig. 1 is a front elevational view of a card potentiometer testing fixture embodying the invention;

Figure 2 is a plan view of the testing fixture showing a potentiometer card in position to be tested;

Fig. 3 is an end view of the testing fixture;

Fig. 5 is a fragmentary sectional view taken along line 5—5 in Fig. 4 showing means for moving the supporting member along the base of the testing fixture;

Figure 7:
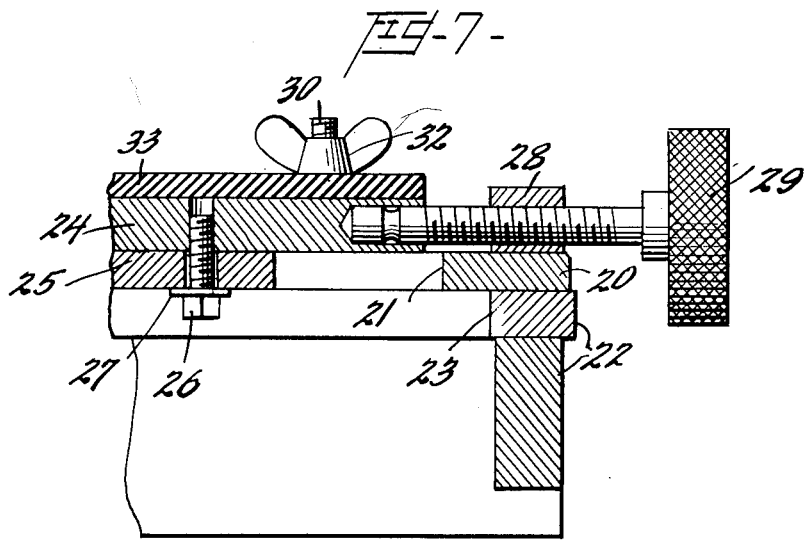
Fig. 7 is a fragmentary sectional view taken along line 7—7 in Fig. 2 showing means for adjusting the position of the potentiometer card on the base of the fixture.

Referring now to the drawings wherein like reference numerals indicate the same elements throughout the several views, and more particularly to Figs. 1, 2 and 3 of the drawings, a base 20 having two slots 21 (Fig. 7) therein is secured to a frame 22 having two slots 23 therein in alignment with the slots 21. A plate 24 is slidably mounted on the upper surface of base 20 and has secured to it two depending guide rails 25 by bolts 26 which extend downwardly through the aligned slots 21 and 23. The guide rails 25 fit into the slots 21 to guide the movement of the plate 24 relative to the base 20. Washers 27 on the depending bolts 26 loosely engage the underside of the base 20 to prevent the plate 24 from being lifted from the base 20. A bracket 28 (Fig. 7) secured to the base 20 has threaded therein a thumbscrew 29 having one end rotatably journalled within a restricted recess in the plate 24. By rotating thumbscrew 29, plate 24 is moved to either the left or right with respect to base 20, as viewed in Figs. 2 and 7. A stud bolt 30 (Figs. 2 and 7) secured to the base 20 extends upwardly through a slot 31 in plate 24 to engage a wing nut 32. The plate 24 is clamped in any desired position on base 20 by tightening wing nut 32 against the upper surface of plate 24.

A dielectric plate 33 is secured to the upper surface of plate 24 to provide an insulated support for a potentiometer card 34 (Fig. 2) having a resistance wire winding 37 so placed thereon that adjacent convolutions of wire on the potentiometer 34 are not short-circuited through plate 24. An index mark 36 etched on the plate 33 is used to locate the card 34 on the plate 33 so that one end of the potentiometer winding 37 is aligned with the mark 36. A plurality of pins 35 which are slidably mounted in base 20 are positioned along the edges of the plates 24 and 33 to provide stops against which the potentiometer card 34 is moved to align the potentiometer winding 37 in a predetermined position. When the potentiometer card 34 is aligned, the pins 35 are pushed down partially into the base 20 to prevent any interference with the testing of said potentiometer card.

Figure 4:
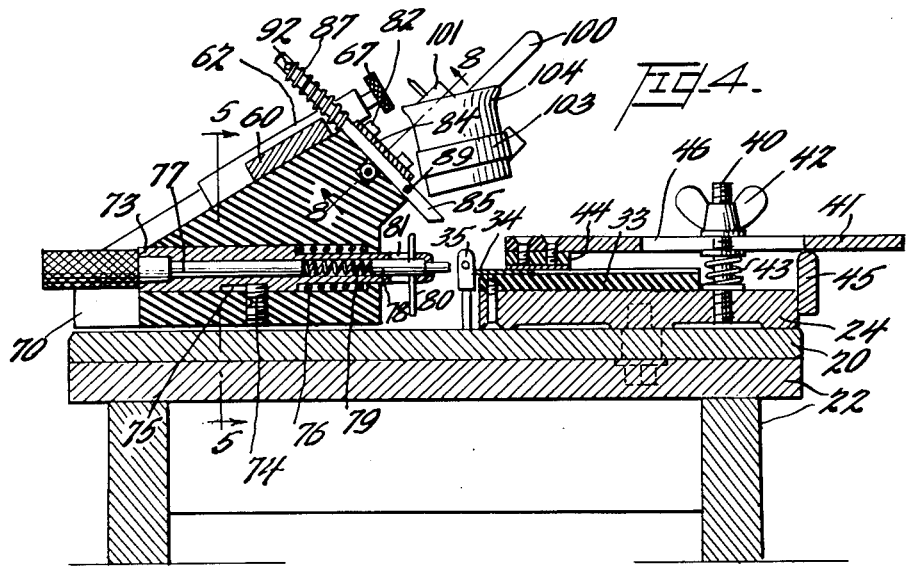
Fig. 4 is a cross sectional view taken along line 4—4 in Fig. 2 showing a supporting member having an electrical contacting arm and a marking pen adjacent the card to be tested.

Each of a plurality of bolts 40 (Fig. 4) secured in the plate 24 extends upwardly therefrom through a slot 46 in an individual arm 41 of a series thereof to engage a wing nut 42. One end of a coil compression spring 43 which encircles stud bolt 40 rests on the plate 24 and the other end of the spring 43 bears against the arm 41 to urge this arm upward into engagement with the wing nut 42. A dielectric laminae 44 is secured to one end of each of the arms 41 and the other end of the arms 41 bears against a fulcrum flange 45 which is welded to an end of the plate 24. When the potentiometer card 34 is moved into the desired predetermined position adjacent pins 35, the insulating laminae 44 are placed on the potentiometer winding 37 and the wing nuts 42 are tightened to force the arms 41 downwardly to clamp the potentiometer 34 in the desired position on the dielectric plate 33. Since only the dielectric laminae 44 are in contact with the potentiometer winding 37, a short-circuit between the winding 37 and the metal parts of the testing fixture is prevented.

Figure 6:
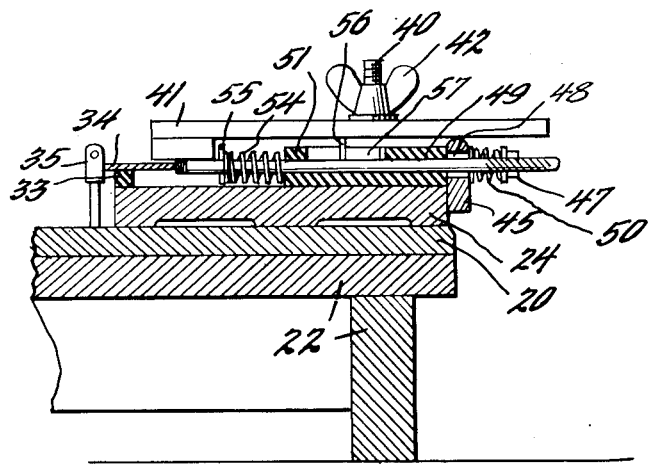
Fig. 6 is a fragmentary sectional view taken along line 6—6 in Fig. 2 showing the spring pressed arm for making electrical contact with the winding of the potentiometer in testing position.

A pair of machine screws 47 (Figs. 2 and 6) extending through a slot 48 in the upright flange 45 are secured to a dielectric block 49 resting on the upper surface of the plate 24. A pair of coiled compression springs 50 are interposed between the flange 45 and the heads of the two screws 47 to resiliently urge the block 49 into engagement with the flange 45 and thereby secure the block 49 in a predetermined position relative to this flange. A projecting portion 51 of the insulating block 49 (Figs. 2 and 6) extends into a slot 52 in the dielectric plate 33 so that an electrically conductive rod 53 slidably mounted in block 49 can be moved into contact with the winding 37 of the potentiometer 34. A coil spring 54 is compressed between the projecting portion 51 and a dowel 55 secured in rod 53 to resiliently urge the rod into contact with the winding 37 of potentiometer 34. Dowel 55 is also utilized as a terminal to make electrical connection between an external test set 19 (Fig. 2) and the potentiometer winding 37. A guide pin 56, also secured to rod 53, projects upwardly through a bayonet slot 57 in block 49 to provide a means for normally holding rod 53 in a retracted position spaced from potentiometer card 34.

A calibrated bar 60 (Figs. 1, 2 and 3) is secured to two spaced supporting members 61 which are rigidly secured to base 20. The bar 60 is positioned parallel to, but spaced from the adjacent edge of the aligned potentiometer card 34. A calibrated arm 62 and a cooperating adjusting arm 63 are slidably mounted on bar 60 to provide a vernier scale for indicating the position of the arm 62 relative to the bar 60. A fine adjustment of the position of calibrated arm 62 is made by tightening a thumbscrew 64 in adjusting arm 63 against bar 60 and then rotating a knurled nut 65 journalled in arm 63 to move a threaded shaft 66 which is secured to arm 62. A thumbscrew 67 may be tightened against bar 60 to hold the arm 62 in any desired position.

A dielectric block 70 (Fig. 5) secured to the arm 62 depends toward the base 20 so that a ball bearing roller 71 mounted within a slot 72 in block 70 makes rolling contact with base 20 to movably support said dielectric block. A sleeve 73 (Fig. 4) slidably mounted in the block 70 is normally urged against a set screw 74 cooperating with a slot 75 in the sleeve 73 by a coil compression spring 76 which is interposed between a shoulder on sleeve 73 and an inwardly extending flange in block 70. A shaft 77 having a knurled end portion is secured within one end of the sleeve 73 and a pointed electrically conductive rod 78 is movably mounted within the other end of the sleeve. The rod 78 is normally urged into engagement with a flanged end of the sleeve 73 by a compression spring 79 which is interposed between the shaft 77 and the rod 78 within the sleeve 73.

An electrically conductive dowel 80 secured to rod 78 extends through aligned elongated slots 81 in sleeve 73 to provide a means for guiding the movement of rod 78 relative to sleeve 73 and to provide a means for electrically interconnecting the rod 78 and the external electrical testing system 19. The pointed rod 78 is moved to the right in Fig. 4 to contact the resistance winding 37 on potentiometer 34 by moving the shaft 77 and sleeve 73 against the action of spring 76 for a distance determined by the length of the slot 75. Since the pointed rod 78 is resiliently mounted to sleeve 73, the rod makes good electrical contact with the potentiometer winding 37 without cutting or marking the wire of the potentiometer 34.

Figure 8:
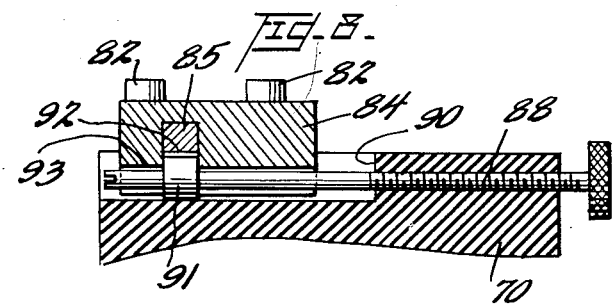
Fig. 8 is a sectional view taken along line 8—8 in Fig. 4 showing means for adjusting the position of the marking pen.
Figure 9:
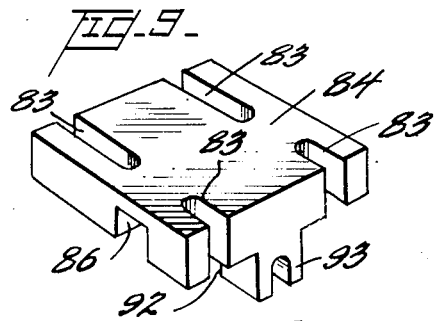
Fig. 9 is a perspective view of a plate for adjustably securing the marking pen to the supporting member as shown in Fig. 2.

A plurality of screws 82 (Figs. 2, 4 and 8) secured in an upper portion of block 70 extend upwardly therefrom through a plurality of elongated slots 83 in an adjustable plate 84 (Fig. 9) mounted on the block. A marking pen 85 (Fig. 4) is slidably mounted in a slot 86 (Fig. 9) in the plate 84 and is normally held in a raised position by a spring 87 (Fig. 4) which is interposed between the plate 84 and a dowel 92 secured to the marking pen 85. Another dowel 89, also secured to pen 85, prevents the spring 87 from forcing the pen 85 out of the slot 86. When desired, the pen 85 is moved against the action of spring 87 to mark a predetermined position on the potentiometer card 34.

Since the desired position to be marked is determined by and coincident with the position of the electrical contacting rod 78, the pen 85 must be aligned with the rod 78. To adjust the transverse position of plate 84 and consequently of pen 85, a shaft 88 (Fig. 8) in threaded engagement with the block 70 extends through a slot 90 in the upper surface of block 70 so that a collar 91 secured to the shaft fits into a notch 92 in a bifurcated portion 93 (Figs. 8 and 9) depending from the plate 84 into the slot 90. Rotation of the shaft 88 advances or retracts the shaft 88 and collar 91 to slide the plate 84 and consequently pen 85 to either the left or right as viewed in Fig. 8.

A pin 100 (Figs. 2, 3 and 4) which is secured to an upper surface of block 70 supports an adjustable clamping bracket 101. One end of a cross arm 102 is adjustably secured to the bracket 101 and the other end of the arm 102 is secured to a flexible metal band 103 (Fig. 4) which holds a magnifying glass 104 above the pen 85 and the contacting rod 78 to aid the operator in visually determining the alignment of the pen 85 and the contacting rod 78 and to assist the operator in more accurately positioning the rod 78 on the winding 37 of potentiometer 34.

In operation, the card potentiometer 34 to be tested is placed on the dielectric plate 33 with the zero resistance end of the winding 37 in alignment with index mark 36 and the operator then moves the potentiometer card 34 against the projecting locating pins 35 to position the winding 37 in parallel alignment with bar 60. The operator then secures potentiometer 34 in this desired position by moving the holddown arms 41 into engagement with the card 34 by tightening the wing nuts 42 against the arms 41. The positioning pins 35 are then retracted until the edge of the potentiometer 34 is free from any obstruction.

The electrical connections to potentiometer 34 are made by connecting a lead from the test set 19 of any desired type to the potentiometer winding 37 at index mark 36. Rod 53 is manually rotated to move the pin 56 out of engagement with the offset portion of bayonet slot 57 so that rod 53 is moved into engagement with the last or end convolution of the potentiometer winding 37; i. e., the high resistance end of the winding 37. If rod 53 does not make contact with the last convolution, the dielectric block 49 is moved along the slot 48 in the flange 45 until the pointed tip of rod 53 contacts this end or last turn of resistance winding 37. Another lead from the test set 19 is connected to the conducting dowel 55 to interconnect the high resistance end of the potentiometer 34 with the test set. A third lead from the test set 19 is connected to conducting dowel 80 to interconnect the movable contacting rod 78, which is the variable resistance contact, with the test set.

The operator then slides arm 62 along bar 60 until the calibrations thereon indicate that the arm 62 is at the zero position adjacent the left end of bar 60 in Fig. 2. Thumbscrew 29 is then rotated to move the plates 24 and 33 until the index mark 36 and consequently the first convolution of the potentiometer winding is aligned with the electrical contacting rod 78. The threaded shaft 88 is then manually rotated to align the marking pen 85 with the pointed rod 78.

Assuming that the potentiometer 34 under test is wound to provide a predetermined linear variation of resistance with respect to displacement, the arms 62 and 63 are moved along bar 60 until the calibrations thereon indicate the approximate position of the first desired ratio between the resistance of the winding 37 and the resistance of the portion of winding 37 which is intercepted between the zero resistance position at the index mark 36 and the resistance testing position of rod 78. At this point, thumbscrew 64 is tightened against the bar 60 to clamp arm 63 in this position.

Shaft 77 is then actuated by the operator to move the contacting rod 78 into engagement with the potentiometer winding 37 and an indicating means 18 on the test set 19 is observed to ascertain if the ratio of resistance is correct. If the ratio is incorrect, knurled nut 65 is rotated to move rod 78 until a proper ratio is observed on the test set indicating means 18. At this time, thumbscrew 67 is tightened against bar 60 to hold arm 62 and block 70 in this adjusted position and shaft 77 is released to move the contacting rod 78 out of engagement with the winding 37. The operator then moves the inked pen 85 into engagement with the particular convolution of winding 37 contacted by rod 78 to mark the winding 37 and potentiometer 34 with a spot of ink to indicate the position of the desired resistance ratio determined by test.

Obviously, the above described method of operating the testing fixture can be progressively repeated along the entire length of the winding 37 to determine and indicate any desired number of resistance ratios. After the potentiometer card 34 is completely tested and calibrated, clamping arms 41 are released and the electrical connections from the test set 19 to the potentiometer winding 37 are removed to condition the fixture for use in testing and marking another potentiometer card.

It is to be understood that the above described embodiment is merely illustrative of the principles of the invention and that numerous other modifications thereof may be devised by those skilled in the art which will embody these principles and fall within the spirit and scope thereof.

What is claimed is:

1. A card potentiometer testing fixture comprising a base, a flat potentiometer card supporting plate movably mounted to the base, means for moving the plate relative to the base, a calibrated bar secured to the base, a calibrated means slidably mounted on the bar for indicating the position of the calibrated means with respect to the bar, and means secured to the calibrated means and movable on the base for making electrical contact with the winding of the potentiometer card.

2. A card potentiometer testing fixture comprising a base, a flat plate having an index mark and movably mounted on the base for supporting a potentiometer card having an electrically conductive winding, means for moving the plate relative to the base to align the first convolution of the electrical winding with the index mark, a supporting bar secured to the base, and means slidably mounted on the bar for making electrical contact with the winding of the potentiometer card.

3. A card potentiometer testing fixture comprising a base, a flat plate mounted on the base for supporting a potentiometer card having an electrically conductive winding, a calibrated bar secured to and spaced above the base, a calibrated arm slidably mounted on the bar and cooperating therewith to indicate the position of the arm relative to the bar, a block secured to the arm and movable on the base, and means secured to the block and movable into engagement with the winding of the potentiometer card for making electrical contact therewith.

4. A card potentiometer testing fixture comprising a base, means for holding a potentiometer card on the base, a plurality of pins movably mounted in said base for aligning the potentiometer card in a predetermined position with respect to said holding means, a calibrated bar secured to and spaced above said base, a calibrated arm slidably mounted on said bar and cooperating therewith to indicate the position of the arm with respect to the bar, a block secured to said arm and in rolling contact with said base, and means movably mounted in said block for engaging the winding of the potentiometer card to make electrical contact therewith.

5. A testing fixture for a card potentiometer having an electrically conducting winding comprising a base, means for holding a potentiometer card on the base, a plurality of pins movably mounted in said base for aligning the potentiometer card in a predetermined position, a calibrated element secured to and spaced above the base, a calibrated arm slidably mounted on said element and cooperating therewith to indicate the position of the arm relative to the element, a dielectric member secured to the arm and in movable engagement with the base, means resiliently mounted in said member and movable into engagement with the potentiometer card winding for making electrical contact therewith, and a marking pen movably mounted in said member in alignment with the electrical contacting means and movable into engagement with the potentiometer card to mark certain desired positions.

6. A testing fixture for a card potentiometer having an electrically conducting winding comprising a base having a pair of aligned slots therein, a flat plate movably mounted on the base for supporting a potentiometer, a pair of guide members secured to an under surface of the plate and extending into the slots in the base for guiding the movement of the plate relative to the base, means secured to the base and rotatably journalled in the plate for moving the plate relative to the base, a member movably mounted on the base for translatory movement parallel to an edge of the potentiometer card mounted on the plate, and means movably mounted on the member and movable into engagement with the winding for making electrical contact therewith.

7. A testing fixture for a card potentiometer having an electrically conductive winding comprising a base, means for holding a potentiometer card in a predetermined position on the base, supporting means movably mounted on the base for linear translatory movement parallel to the winding of the potentiometer, means for moving the base and the card into a predetermined position relative to the said supporting means, electrical contacting means movably mounted in said supporting means and movable into engagement with the winding of the potentiometer card in said predetermined position to make electrical contact therewith, and an indicating means connected to said electrical contacting means and to the ends of the potentiometer winding to indicate the ratio of the resistance of a part of the winding to the whole in said predetermined position.

8. A testing fixture for a card potentiometer having an electrically conductive winding comprising a base, means for positioning a potentiometer card on the base with an edge of the card in a predetermined position, means for holding the card on the base in said predetermined position, supporting means movably mounted on the base for linear translatory movement parallel to said winding of the potentiometer card, electrical contacting means mounted in said supporting means and movable into engagement with said winding to make electrical contact therewith, and an indicating means connected to said electrical contacting means and to the ends of the potentiometer winding to indicate the ratio of the resistance of a part of the winding to the whole with the card in a predetermined position after said positioning.

9. A testing fixture for a card potentiometer having an electrically conducting winding comprising a base, a flat plate movably mounted on the base for supporting a potentiometer card under test, means secured to the base and rotatably journalled in the plate for moving the plate relative to the base, means slidably mounted in the base for positioning the winding of the potentiometer card in a predetermined alignment on the plate, holding means engaging the base for securing the potentiometer card on the plate in said predetermined alignment, a calibrated bar secured to and spaced above the base, a calibrated arm slidably mounted on said bar for linear translatory movement parallel to said aligned potentiometer card, a supporting member secured to the arm and in movable engagement with the base, electrical contacting means slidably secured to said supporting member and movable into engagement with the winding to make electrical contact therewith, and marking means slidably secured to said supporting member in alignment with said electrical contacting means for marking desired positions on the card.

10. A testing fixture for a card potentiometer having an electrically conductive winding comprising a base, a flat plate movably mounted on the base for supporting a potentiometer card under test, means secured to the base and rotatably journalled in the plate for moving the plate relative to the base, means slidably mounted in the base for positioning the winding of the potentiometer card in a predetermined alignment on the plate, holding means engaging the base for securing the potentiometer card on the plate in said predetermined alignment, a first resiliently biased electrical contacting means slidably mounted on the base and movable into engagement with the electrically conductive winding to make electrical contact therewith, a calibrated bar secured to and spaced above the base, a calibrated arm slidably mounted on said bar for linear translatory movement parallel to the aligned potentiometer card, a supporting member secured to the arm and movable on the base, a second electrical contacting means slidably secured to said supporting member and movable into engagement with the winding to make electrical contact therewith, and marking means slidably secured to said supporting member in alignment with said second electrical contacting means for marking desired positions on the card.

11. A testing fixture for a card potentiometer having an electrically conductive winding comprising a base, a calibrated bar secured to and spaced above the base, a calibrated arm slidably mounted on the bar and cooperating therewith to indicate the position of the arm relative to the bar, a block secured to said arm and in movable engagement with the base, means resiliently mounted in said block for engaging the winding of the potentiometer card to make electrical contact therewith at a predetermined point, and means resiliently mounted in said block for marking the said point of electrical contact on the winding of the potentiometer card.

12. A testing fixture for a card potentiometer having an electrically conducting winding comprising a base, supporting means movably mounted on the base for linear translatory movement parallel to the winding of the potentiometer card, electrical contacting means movably mounted in said supporting means and movable into engagement with the winding to make electrical contact therewith, marking means mounted in said supporting means movable into engagement with the winding of the potentiometer card to mark certain desired positions thereon, and adjustable means for aligning said marking means with the electrical contacting means to mark the card in predetermined positions of desired resistance ratios of portions of the winding to the entirety thereof.

VIDAL DUCASSE.

References Cited in the file of this patent

UNITED STATES PATENTS

| Number | Name | Date |
|---|---|---|
| 739,001 | Hoopes | Sept. 15, 1903 |
| 1,789,358 | Franks | Jan. 20, 1931 |
| 2,264,873 | Corkrell | Dec. 2, 1941 |
| 2,276,011 | Billstein | Mar. 10, 1942 |
| 2,459,228 | Konicek et al. | Jan. 18, 1949 |
| 2,469,465 | Hamilton et al. | May 10, 1949 |
| 2,527,812 | Hamilton et al. | Oct. 31, 1950 |
| 2,568,461 | Scott | Sept. 18, 1951 |